United States Patent
Gibson et al.

(10) Patent No.: US 12,387,462 B2
(45) Date of Patent: Aug. 12, 2025

(54) PRE-PROCESSING FOR AUTOMATIC TOPOGRAPHIC FEATURE EXTRACTION

(71) Applicant: Ordnance Survey Limited, Southampton (GB)

(72) Inventors: Harry Gibson, Southampton (GB); Joseph Braybrook, Southampton (GB); Kyriaki Dionysopoulou, Southampton (GB); Oliver Ralph, Southampton (GB)

(73) Assignee: Ordnance Survey Limited, London (GB)

( * ) Notice: Subject to any disclaimer, the term of this patent is extended or adjusted under 35 U.S.C. 154(b) by 377 days.

(21) Appl. No.: 18/118,907

(22) Filed: Mar. 8, 2023

(65) Prior Publication Data
US 2024/0020950 A1    Jan. 18, 2024

(30) Foreign Application Priority Data
Mar. 8, 2022   (EP) .................................. 22160716

(51) Int. Cl.
*G06V 10/764* (2022.01)
*G06V 10/32* (2022.01)
*G06V 10/771* (2022.01)
*G06V 10/774* (2022.01)

(52) U.S. Cl.
CPC ............ *G06V 10/764* (2022.01); *G06V 10/32* (2022.01); *G06V 10/771* (2022.01); *G06V 10/774* (2022.01)

(58) Field of Classification Search
None
See application file for complete search history.

(56) References Cited

U.S. PATENT DOCUMENTS

| | | | |
|---|---|---|---|
| 2020/0184214 A1* | 6/2020 | Casas | G06N 3/126 |
| 2021/0027055 A1* | 1/2021 | Rainbow | G06V 20/176 |

OTHER PUBLICATIONS

Zhu, Zhe et al., "Optimizing selection of training and auxiliary data for operational land cover classification for the LCMAP initiative," ISPRS Journal of Photogrammetry and Remote Sensing, vol. 122, Nov. 21, 2016, pp. 206-221.

Benedetti, Roberto et al., "A simulated annealing-based algorithm for selecting balanced samples," Computational Statistics, vol. 37, No. 1, May 26, 2021, pp. 491-505.

Tasar, Onur et al., "Continual Learning for Dense Labeling of Satellite Images," IGARSS 2019, IEEE International Geoscience and Remote Sensing Symposium, Jul. 28, 2019, pp. 4943-4946.

* cited by examiner

*Primary Examiner* — Leon Flores
(74) *Attorney, Agent, or Firm* — Banner & Witcoff, Ltd.

(57) ABSTRACT

Computer-implemented methods and systems are provided for pre-processing image data to generate improved training data for training a machine learning system to automatically classify imagery. One or more images of a geographic region are captured and processed to obtain a plurality of labelled samples (also referred to as patches) for training the machine learning system. To do this, the amount that each class is contained within each area image relative to the whole dataset is measured, with the distribution of classes being weighted according to this measurement and normalised to determine how many patches per class and per area should be taken.

20 Claims, 7 Drawing Sheets

PRE-PROCESSING FOR AUTOMATIC TOPOGRAPHIC FEATURE EXTRACTION

TECHNICAL FIELD

Embodiments disclosed herein relate to computer-implemented methods and systems for generating training data for training a machine learning system to automatically extract topographic features. In particular, aspects described herein relate to a method of pre-processing image data to generate improved training data.

BACKGROUND

Most providers of digital maps rely on a very detailed topographical map database which stores the underlying data. For example, Ordnance Survey uses the very large-scale topographic product OS MasterMap®, which records every feature larger than a few metres in one continuous dataset, and is constantly being updated.

A topographic feature is an abstraction of a real-world object. It is not the real-world object itself. For instance, the OS MasterMap® product is composed of discrete vector features, each of which has a feature type, geometry, and various feature attributes. More details about this product can be found in the manual *OS MasterMap® Topography layer—User guide and technical specification, v1.12—*March 2014.

One technique used to obtain and update the vector features of the topographic data is to process aerial imagery and extract the vector information therefrom. To do this, machine learning systems can be trained to do this automatically without the need for laborious manual inspection. However, appropriate data must be used to accurately train a machine learning algorithm to do this. A deep learning model needs to be "trained" by showing it samples of imagery along with labels stating what class each pixel of the imagery belongs to. In this respect, a smaller area that has been mapped "correctly" by other means is needed in order to train a model that can then be used to map much larger areas. Production of such training data is time-consuming and expensive.

For every output class that the model needs to be able to recognize, the training data must contain a sufficient number and variety of samples of that class. Thus, it is not sufficient to simply select an arbitrary subsection of the area of interest for manual mapping, because it may contain very few pixels of particular features, for example, "railway" pixels, and so the model will not get sufficient practice at recognizing those types of features.

Furthermore, all other things being equal, the model will gain expertise at recognizing each class in proportion to the amount of training data of that class it sees. Consequently, the relative prevalence of each class within the training data should be somewhat balanced. For example, the number of "railway" pixels present should be as close as possible to the number of grassland pixels.

Therefore, an improved approach to generating the training data from imagery is needed.

SUMMARY

Aspects described herein address the above noted problems by providing computer-implemented methods and systems for pre-processing image data to generate improved training data for training a machine learning system to automatically classify imagery. One or more images of a geographic region are captured and processed to obtain a plurality of labelled samples (also referred to as patches) for training the machine learning system, with each image containing a part of the geographic region of interest. To do this, the amount that each class is contained within each area image relative to the whole dataset (i.e., the whole geographic region captured) is measured, with the distribution of classes being weighted according to this measurement and normalised to determine how many patches per class and per area should be taken. This ensures that the distribution of patches taken from each area prioritises features that are less common.

Further processing may then be carried out to select the optimal set of training data from the patches available, whilst fulfilling the required distribution of patches. This can be done by selecting patches in order of class frequency, wherein patches containing the rarest classes (i.e., the lowest frequency) are prioritised over the more common classes (i.e., the highest frequency). Alternatively, the training data can be selected using a method based on simulated annealing, which iteratively searches through subsets of the available patches to identify a solution that is as close to the most optimal solution as possible. This iterative search can be done using the target distribution determined in the distribution process, or some other target number of patches per class. In doing so, an optimal patch configuration is determined that results in the distribution of pixel classes being as even as possible, thus leading to more robust models, particularly when used to train in conjunction with distribution process to account for any remaining imbalance.

Accordingly, a first aspect provides a computer-implemented method of processing image data for use in training a machine learning system for classifying image data, the method comprising obtaining image data comprising a plurality of images, each image corresponding to a respective geographic area, processing the image data to identify one or more classes of topographic feature contained within each image, wherein processing the image data comprises determining a quantity of each respective topographic feature class contained within each image, generating a first dataset comprising a set of values for each image, wherein each value is representative of the quantity of one of the plurality of topographic feature classes contained within the respective image, and processing the first dataset to determine a number of samples required from each image for each topographic feature class. Processing the first dataset comprises (i) generating a normalised dataset, wherein the values of the first dataset are normalised across each image and each topographic feature class, and (ii) for each topographic feature class, calculating the number of samples required from each image based on the normalised dataset and a target number of samples for the respective topographic feature class.

As such, the amount of each class within each image representative of a geographic region is measured. These measurements are then first normalised across each image. That is to say, for each image, the measurements from each class within that image are normalised. The measurements are then normalised across each class. That is, for each class, the measurements from each image corresponding to that class are normalised. For each class, the number of samples required from each image can then be determined from the normalised dataset and a target number of samples for the given class. In this respect, the normalised data will indicate the proportion of the target number of samples needed from each image. For example, if the target number of samples is 10 and there are three images, the normalised data may indicate that 5 samples are required from the first image (i.e., 50% of the target), 3 samples are required from the second image (i.e., 30% of the target) and 2 samples are required from the third image (i.e., 20% of the target). In doing so, the distribution of samples taken from each image prioritises classes of feature that are less common.

In some arrangements, each value may be indicative of a number of pixels within an image comprising one of the plurality of topographic feature classes. For example, each value may be a direct measurement or a proportion of the number of pixels within an image containing that feature class.

In some arrangements, generating the first dataset may comprise populating a table comprising rows and columns with the set of values for each image, wherein each column corresponds to a respective image and each row corresponds to a respective topographic feature class.

In such cases, generating the normalised dataset may further comprise generating a first normalised dataset, wherein the values of the table are normalised across each column, and generating a second normalised dataset, wherein the values of the first normalised data set are further normalised across each row.

Each row of the second normalised dataset may then be multiplied by a target number of samples for the respective topographic feature class to thereby determine the number of samples required from each image.

In some cases, generating the first normalised dataset may comprise normalising the values of the table such that all values within each respective image sum to approximately 1. That is to say, the values in each column are normalised such that each column sums to approximately 1. Generating the second normalised dataset may then comprise further normalising the values of the first normalised dataset such that all values corresponding to each respective topographic feature class sum to approximately 1. That is to say, the values normalised across each column may then be further normalised across each row, such that each row sums to approximately 1.

Generating the normalised dataset may further comprise summing the values of the table across each topographic feature class to determine a total quantity of each topographic feature class within the first dataset, determining a multiplier for each topographic feature class based on the total quantity of said topographic feature class relative to a topographic feature class having a highest total quantity, and multiplying the values of the table for each topographic feature class by its respective multiplier, wherein the multiplied values are used to generate the first normalised dataset.

A sample may comprise a portion of an image. That is to say, each image is divided into a plurality of tiles, each tile providing a sample.

The method may further comprise selecting one or more samples from each image based at least in part on the number of samples determined for each topographic feature class.

In some cases, selecting the one or more samples from each image may comprise selecting at least one sample twice or more, wherein at least one version of a sample selected twice or more is augmented. For example, a copy of the sample may be augmented using any suitable method, such as taking a mirror image, changing the colour contrast, blurring the image, taking a sub-image or any other suitable modification. In doing so, patches that are particularly useful (e.g. they contain a lot of a rare class of feature) can be used multiple times in order to obtain a balanced dataset.

The method may further comprise training a machine learning system to classify images using the selected one or more samples.

In some arrangements, selecting one or more samples from each image may further comprise selecting samples from each image based on the number of samples determined for each topographic feature class and a total quantity of each topographic feature class contained within the first dataset, wherein samples containing the topographic feature class having the smallest total quantity are selected first. That is to say, samples for each feature class are selected in order of feature class prevalence, with samples containing the least prevalent classes being selected first and samples containing the most prevalent classes being selected last.

Alternatively, selecting one or more samples from each image may further comprise identifying a plurality of samples for each image, wherein each sample comprises a portion of said image, identifying one or more classes of topographic feature contained within each sample, wherein the identifying comprises determining a quantity of each respective topographic feature class contained therein, and applying a simulated annealing algorithm to the plurality of samples, wherein the simulated annealing algorithm iteratively selects candidate subsets of samples from the plurality of samples for each image, and scores the candidate subsets of samples according to the quantities of the topographic feature classes contained therein, to thereby identify an optimal subset of samples from each image such that a balanced distribution of the topographic feature classes is obtained.

In such cases, applying the simulated annealing algorithm comprises selecting, for each image, an initial subset of samples from the plurality of samples, wherein each initial subset of samples is scored according to the quantities of the topographic feature classes contained therein, selecting, for each image, a candidate subset of samples from the plurality of samples, the candidate subset of samples being at least partially different to the initial subset of samples, wherein each candidate subset of samples is scored according to the quantities of the topographic feature classes contained therein, comparing the score of the candidate subset of samples to the score of the initial subset of samples to thereby determine whether the candidate subset of samples is an improved solution.

A further aspect provides a system comprising a processor, and a computer readable medium storing one or more instruction(s) arranged such that when executed the processor is caused to perform a method outlined above.

BRIEF DESCRIPTION OF THE DRAWINGS

Further features and advantages will become apparent from the following description of embodiments thereof, presented by way of example only, and by reference to the drawings, wherein.

DETAILED DESCRIPTION

Overview

Aspects described herein relate to methods of pre-processing image data to generate improved training data for training a machine learning system to automatically extract topographic features.

The machine learning system to be trained comprises a deep learning algorithm designed to semantically segment aerial or satellite images into land cover maps, which can then be processed further to output topographic maps. In this respect, the problem of creating maps from imagery treated as one of "semantic segmentation", whereby each pixel within the image is allocated to a single class, from the set of classes that will be represented on the output land cover map, for example, building, road, water, railway, vegetation and the like. A post-processing step then generates the topographical map by "cleaning up" this output, for example, by polygonising continuous regions of pixels allocated to the same class and then regularizing those outlines into realistic shapes depending on the feature they represent, for example, so that buildings have straight edges.

It will be appreciated that any suitable machine learning model capable of classifying images may be used. For example, a convolutional neural network based on U-Net may be trained to perform semantic segmentation of aerial images using a gradient descent algorithm.

Figure 1:
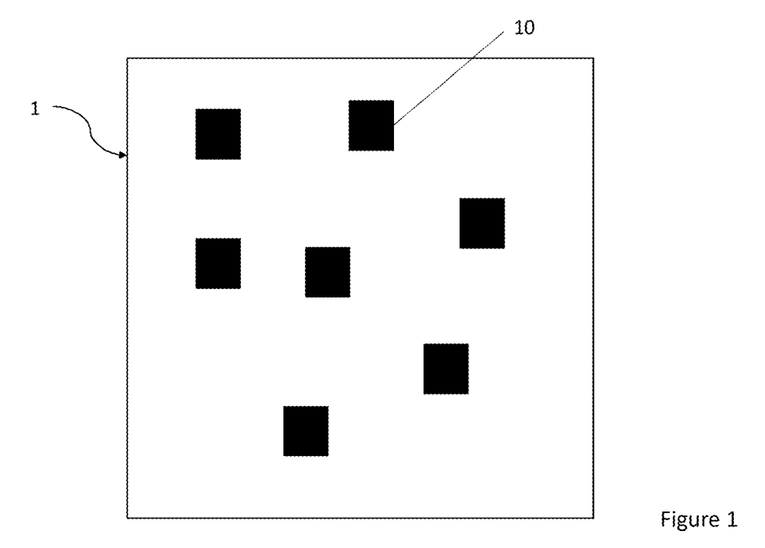
FIG. 1 is a diagram illustrating the context of aspects described herein.

In order to train the machine learning system to accurately classify each pixel of a target image, it is important to use training data that has a balanced distribution of pixels for each of the classes that are to be used. Typically, as illustrated by FIG. 1, this is performed by capturing one or more test images 1 of different regions, and then selecting sample areas 10 (referred to herein as "patches") within each test image 1 to label. In this respect, most test images 1 are too large to label entirely. To overcome this, each test image 1 will be divided into a grid of patches 10, and then patches 10 that represent different geographies, biomes or urban types are selected and labelled in order to obtain a set of patches, wherein each of the classes appear within at least one patch. Deciding how to select patches 10 so that all regions are represented well without giving undue preference to a given class can be very difficult to achieve and requires laborious manual inspection that is both expensive and time consuming.

Aspects described herein seek to improve the generation of training data by providing methods of optimizing the distribution of sample areas, wherein the patches are selected by both region and class, and methods of optimizing the patch selection to minimize class imbalance within each patch.

Distribution of Patches

A problem with geographic distribution of training data is that examples of some classes only appear in certain areas. For example, railway lines will not appear in a large number of images, compared to buildings or vegetation. A random distribution actively biases against these classes and would result in a small number of patches being used to determine an entire class.

Additionally, different areas have different signatures (for example, buildings in the business district of a city will look different to those in a residential area), and so it is important to select patches from different locations across a wide variety of different classes, as patches from the same area tend to train the machine learning system to only detect features from that location.

The distribution method described herein thus ensures that the patches fed into the model have at least some of each classes in equal proportion, and ensures that the existence of the class is balanced across the set of patches. This helps to smooth and stabilize the minority classes and ensures the model actively trains on the class across thousands of examples rather than a few hundred.

For small, targeted locations such as a city or a regional province captured at very high resolution, the availability of training data is a large problem. Typically, tens of thousands of patches are needed to train a model and training data will be sparse in these areas. In this respect, due to the high resolution of the imagery, there will be a limited quantity of imagery containing only some of the required classes and very little high quality pre-existing data.

Aspects described herein address the above problems by first obtaining images of 500×500 metre regions scattered around the target location to get a diverse set of samples of different geographies. By sampling in this way, it is cheaper to capture a block of images and then generate patches therefrom, rather than trying to capture lots of individual patches. It will however be appreciated that images of any suitable size may be obtained.

The method then determines the number of patches to be selected from each of these regions to ensure that an approximately equal number of patches is taken from each region, whilst at the same time ensuring that each class is present in substantially the same name of patches.

For example, for a dataset of 10000 patches and 5 classes, it may be necessary that each class exists in at least 2000 of the patches. This means that the model is exposed to the class during gradient descent even if only in a few pixels. Any shortfalls due to saturation can be made up, for example, using data augmentation techniques, which will be targeted at the relevant class rather than being random. Likewise, if that dataset of 10000 patches corresponds to 100 regions, approximately 100 patches will have been taken from each region.

In known methods, random sampling is used to tile up an image into patches, and this often biases against certain classes, leaving only a hundred patches to train from out of a dataset that may comprise 10000 patches.

Therefore, an objective is to determine a distribution within the training dataset that best represents the geographic diversity but also enforces a minimum frequency with which classes will appear within the patch dataset. This minimizes sharp spikes from minority classes that may only be frequent in high density at a particular location.

Figure 2:
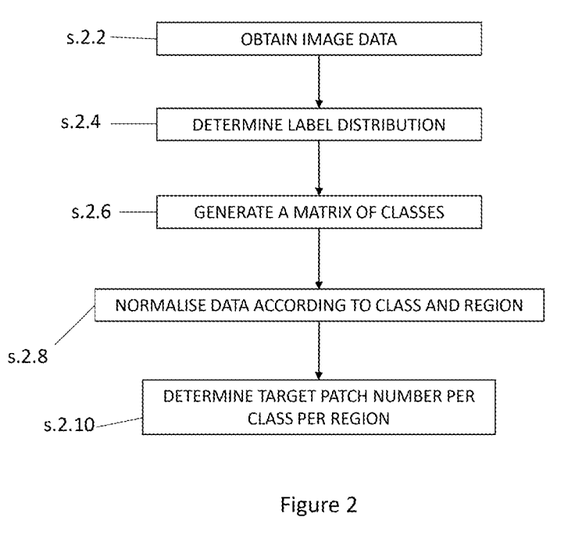
FIG. 2 is a flow diagram illustrating an aspect of the pre-processing in accordance with the present disclosure.

FIG. 2 is a flow diagram illustrating the method of optimizing the distribution of sample areas (i.e., patches).

At step 2.2, image data corresponding to a plurality of different locations and geographies is obtained. For example, images representative of a 500×500 metre area may be captured at around 100 different locations and covering a plurality of different geographies (e.g. rural areas, urban areas, industrial areas and the like). However, it is important that these do not overlap as this can skew the distribution. Additionally, the classification labels need to be available for each of the areas captured.

At step 2.4, the label distribution is calculated for each area (i.e., for each image). That is to say, the number of pixels in each image corresponding to each class is counted.

For example, in one image, there may be 100 pixels of grass, 400 pixels of road, 10000 pixels of building, etc.

Figure 3A:
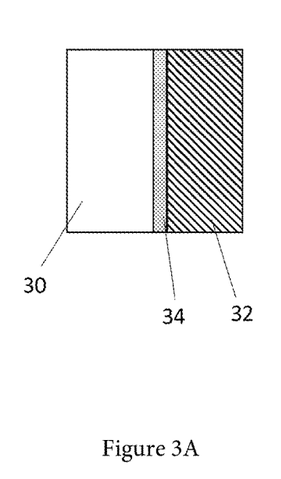
FIGS. 3A-C illustrate the pre-processing in accordance with the present disclosure.
Figure 3B:
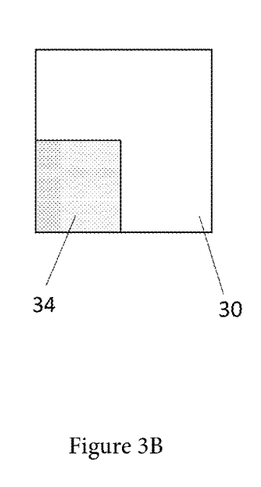
Figure 3C:
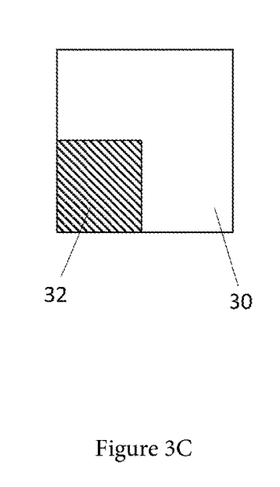

FIG. 3 illustrates an example of the label distribution calculated for three different regions A, B and C. Region A is 50% road pixels 30, 40% building pixels 32 and 10% vegetation pixels 34. Region B is 75% road pixels 30 and 25% vegetation pixels 34. Region C is 75% road pixels 30 and 25% building pixels 32.

At step 2.6, these label distributions are stacked together to form a matrix of the classes calculated against the region they were captured in, which is repeated until a full matrix covering all classes and regions has been generated, as illustrated by Table 1 below.

TABLE 1

| Class | Region A | Region B | Region C |
|---|---|---|---|
| Road | 50 | 75 | 75 |
| Building | 40 | 0 | 25 |
| Vegetation | 10 | 25 | 0 |

It will of course be appreciated that the dataset may be used to populate any suitable data structure such as a table format At step 2.8, the data is normalized according to the class and the region. Firstly, the most prevalent class across the entire dataset (i.e., across all images) is determined. That is to say, the class that has the highest number of pixels across all regions is identified, as illustrated by Table 2 below.

TABLE 2

| Class | Region A | Region B | Region C | Total |
|---|---|---|---|---|
| Road | 50 | 75 | 75 | 200 |
| Building | 40 | 0 | 25 | 65 |
| Vegetation | 10 | 25 | 0 | 35 |

A multiplier, $M_n$, for each target class, n, is then calculated to bring the total number of pixels, $P_n$, across all regions up to the same number of pixels, $P_m$, as the most prevalent class, m:

$$M_n = \frac{P_m}{P_n} \quad [1]$$

Applying this to the example of FIG. 3, the following multipliers are calculated:

TABLE 3

| Class | Region A | Region B | Region C | Total | $M_n$ |
|---|---|---|---|---|---|
| Road | 50 | 75 | 75 | 200 | 1 |
| Building | 40 | 0 | 25 | 65 | 3.076923077 |
| Vegetation | 10 | 25 | 0 | 35 | 5.714285714 |

Each value within the matrix is then multiplied by its corresponding class multiplier $M_n$ to obtain the effective number of patches for each region per class:

TABLE 4

| Class | Region A | Region B | Region C |
|---|---|---|---|
| Road | 50 | 75 | 75 |
| Building | 123.0769231 | 0 | 76.92307692 |
| Vegetation | 57.14285714 | 142.8571429 | 0 |
| Total per Area | 230.2197802 | 217.8571429 | 151.9230769 |

The matrix is then normalised across each region so that all values within a region sum to approximately 1. That is to say, the multiplied values for each class within a region are normalised so that they sum to approximately 1. This is done by dividing each value within its matrix by the total of the respective area, as shown by Table 5 below.

TABLE 5

| Class | Region A | Region B | Region C | Total per Class | Reciprocal of Total per Class |
|---|---|---|---|---|---|
| Road | 0.217183771 | 0.344262295 | 0.493670886 | 1.055116952 | 0.947762234 |
| Building | 0.534606205 | 0 | 0.506329114 | 1.040935319 | 0.960674483 |
| Vegetation | 0.248210024 | 0.655737705 | 0 | 0.903947729 | 1.106258657 |
| Total per Region | 1 | 1 | 1 | | |

The matrix is then normalised across each class such that the values for each class across all regions also add up to 1. This is done by calculating the reciprocal function of the total per class (i.e., 1 divided by the total per class), as shown in Table 5, and multiplying the values within the matrix by the reciprocal value for the respective class.

TABLE 6

| Class | Region A | Region B | Region C | Total per Class |
|---|---|---|---|---|
| Road | 0.205838576 | 0.326278802 | 0.467882622 | 1 |
| Building | 0.51358254 | 0 | 0.48641746 | 1 |
| Vegetation | 0.274584488 | 0.725415512 | 0 | 1 |

The result is a probability distribution which ensures for each class, a certain number of patches will be selected containing each class. That is to say, it ensures the existence of the class is present in X patches.

At step 2.8 for a given target patch number per class, the values of the matrix are multiplied by the target number to determine how many patches from each region for each class are required. For example, the target number of patches may be 10,000 patches per class:

TABLE 7

| Class | Region A | Region B | Region C | Total Class Patches |
|---|---|---|---|---|
| Road | 2058.38576 | 3262.78802 | 4678.82622 | 10000 |
| Building | 5135.8254 | 0 | 4864.1746 | 10000 |
| Vegetation | 2745.84488 | 7254.15512 | 0 | 10000 |
| Total Area Patches | 9940.056035 | 10516.94314 | 9543.00082 | |

It will be appreciated that any suitable target number of patches may be used, depending on the requirements of the machine learning system that is to be trained.

An integer of these values will then be taken, usually by rounding down to avoid taking more patches than is needed, as shown in Table 8 below.

TABLE 8

| Class | Region A | Region B | Region C | Total Class Patches |
|---|---|---|---|---|
| Road | 2058 | 3262 | 4678 | 9998 |
| Building | 5135 | 0 | 4864 | 9998 |
| Vegetation | 2745 | 7254 | 0 | 9998 |
| Total Area Patches | 9938 | 10516 | 9542 | |

In doing so, approximately the same number of patches per class is obtained, with a similar number of patches per region within an order of magnitude.

Figure 4:
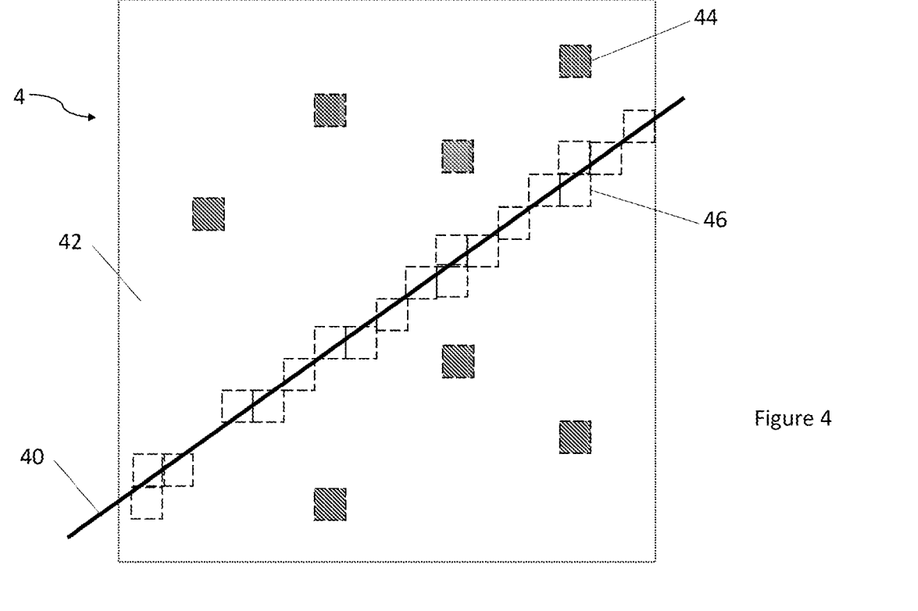
FIG. 4 further illustrates the pre-processing in accordance with the present disclosure.

As such, by measuring how much of each class is contained within each patch relative to the global dataset and weighting the distribution according to this measurement, this ensures that the distribution of patches taken from each area prioritises features that are less common. For example, FIG. 4 shows a region 4 comprising a railway line 40, a large region of vegetation 42 and several buildings 44. As features such as railway lines 40 are less common, the above method will prioritise patch distribution within the region 4 to be localised to the railway line 40. As such, the majority of the patches 46 taken from the region 4 will comprise the railway line 40.

Allocation of Patches

Once training data have been collected across one or more areas, it is likely that the distribution of the classes across the data will still need further optimisation. Geographic data in a multiclass context is notoriously difficult to balance due to the fact that patches will have a combination of different classes with vastly different frequency rates. Classes such as grassland or natural surface by their nature cover larger areas than roads or railways, and so by gathering training data across contiguous blocks in those areas will likely result in many more pixels of some classes than others. As described above, this is something that needs addressing to develop robust models that can be applied to any geographic location.

In reality, the classes are not balanced across any geographic area. Therefore, in order to create balanced training data, it is necessary to either to under-sample the common classes, or oversample the rare classes. The proposed "allocation" step thus provides a process that seeks to select the optimal set of training data from that which is available.

One approach is to select patches from the available set, prioritizing by the relative scarcity (i.e., frequency) of the classes they contain. That is, for each geographic area the "distribution" process above determines how many patches containing each class should be selected to ensure that that the features from that class in that region are proportionally represented in the whole. This number may be less than what is available in the case of common classes, so we first take the rarest class and for all possible patches in that geographic region select the number of patches of that class requested by the distribution (or all that are available, if fewer); then repeat this for each other class in turn in order of prevalence.

Figure 5:
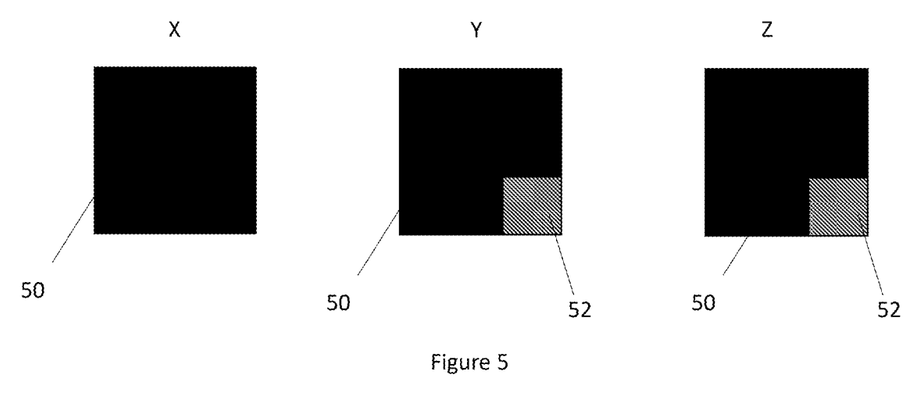
FIG. 5 illustrates an aspect of the pre-processing in accordance with the present disclosure.

An example of this approach is illustrated by FIG. 5, which shows three candidate patches X, Y and Z. The distribution processing has determined that two patches of vegetation class 50 and two patches of building class 52 are needed for input to the machine learning system. The patches are selected by the least prevalent class, filling the distribution until full. In this case, the vegetation class 50 makes up 80% and the building class 52 makes up 20%, and so patches Y and Z are selected first in order to provide the two patches of building class 52 required by the distribution. This leaves only patch X for the vegetation class 50, and so patch X will be selected, along with an augmented patch X', to thereby provide the two patches of vegetation class 50 required by the distribution.

A drawback of the process described above is that each patch is allocated to one class, whereas in reality it may contain numerous classes, for example, patches Y and Z also contain portions of the vegetation class. By selecting all the building patches first, there will be more vegetation pixels than intended within the finished set. Thus ideally, all pixels present in a patch need to be considered when selecting it for inclusion in the training dataset.

To do this, an alternative approach to this allocation process is proposed based on the Simulated Annealing method.

The simulated annealing algorithm is an optimization algorithm aiming to simulate the physical process of annealing used in metallurgy, which works by randomly permuting the solution at each step, and at each step choosing whether to accept the new solution or stick with the existing solution by comparing the 'score' of each solution according to some deterministic scoring algorithm. An improved solution will always be accepted; a worse solution may be accepted according to a probability that decreases over time as the problem/solution space is gradually explored. This can be described as slow cooling to a locally-optimal solution that is likely to compare favourably to a true globally-optimal solution, with the algorithm eventually reaching a 'temperature' of zero with very few changes made.

In this approach, the problem can be represented as a "fair subset sum" problem. This belongs to a class of problems known as "NP-hard" which means that a perfect solution is unlikely to be possible. Instead, an algorithm is used that attempts lots of different solutions in a heuristic approach to try to find a solution that is likely to be "nearly" as good as possible. Simulated annealing is one algorithm for exploring this kind of problem space and iterating towards a globally good solution.

Figure 6:
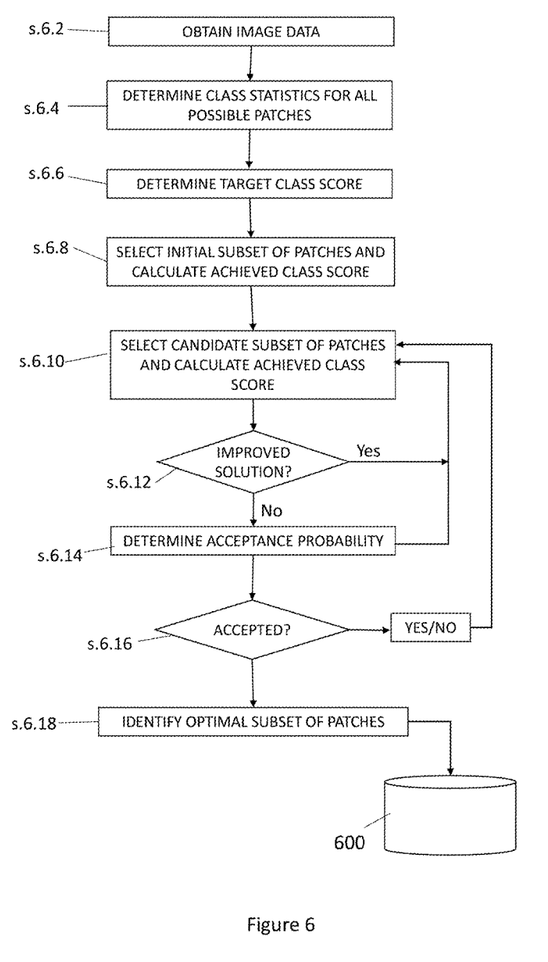
FIG. 6 is a flow diagram illustrating an aspect of the pre-processing in accordance with the present disclosure.

FIG. 6 is a flow diagram illustrating the method of selecting a training dataset from the patches available to meet a target allocation, which will be as balanced as possible in terms of overall class pixel count (or occurrence) whilst meeting the distribution determined in the method described according to FIG. 2.

At step 6.2, image data corresponding to a plurality of different locations and geographies is again obtained. This will be the same image data as that obtained in step 2.2 above and used to determine the optimal distribution of patches.

To represent patch allocation as a problem that can be solved by simulated annealing, the class patch statistics of all possible patches for a given region is first considered in a table or matrix format (step 6.4).

In this respect, for a given patch size, each image of a geographic region is divided into patches of this size and the class statistics of each patch determined. As a basic example, if the patch size is 224×224 pixels and the images are 2240×2240 pixels, each image is divided into 100 patches (10×10). In some cases, an overlapping grid may be used such that more patches fit within each image, including the case where every image pixel (except those less than 224 pixels from the right/bottom edges) is the top-left corner of a patch (i.e., 223 pixels of overlap). However, for the purposes of the following description, no overlap is assumed.

Considering an example shown in FIG. 3, but in the simplified case that there are 5 possible patches within each region, the following table of class statistics may be generated.

TABLE 9

| Candidate Patch | Region | Road | Building | Vegetation |
|---|---|---|---|---|
| a | Region A | 2000 | 0 | 500 |
| b | Region A | 0 | 2000 | 200 |
| c | Region A | 500 | 2000 | 0 |
| d | Region A | 500 | 0 | 200 |
| e | Region A | 1500 | 0 | 100 |
|   | SUBTOTAL | 5000 | 4000 | 1000 |
| f | Region B | 2500 | 0 | 2200 |
| g | Region B | 2500 | 0 | 0 |
| h | Region B | 1000 | 0 | 0 |
| i | Region B | 1000 | 0 | 300 |
| j | Region B | 500 | 0 | 0 |
|   | SUBTOTAL | 7500 | 0 | 2500 |
| k | Region C | 0 | 500 | 0 |
| l | Region C | 0 | 500 | 0 |
| m | Region C | 5000 | 500 | 0 |
| n | Region C | 2000 | 500 | 0 |
| o | Region C | 500 | 500 | 0 |
|   | SUBTOTAL | 7500 | 2500 | 0 |
|   | Total | 20000 | 6500 | 3500 |

Each row contains columns giving the number of pixels present from each class in that patch. As such, the statistics represent the actual area of each class present in each patch. The total of each column, therefore, gives the number of pixels from that class across all the patches, wherein the total will be much higher for the more prevalent classes.

Alternatively, the patch statistics may be provided in a binary number format, wherein a zero or a one is used to indicate whether a certain class is contained within that patch, as shown in Table 10 below. In this respect, a predetermined threshold of pixels may be set to determine whether a class is considered to be contained within a patch. For example, if there are 100 or less pixels of a certain class within a patch, that class may receive a binary number 0 for that patch, whereas classes with more than 100 pixels present may receive a binary number 1.

TABLE 10

| Candidate Patch | Region | Road | Building | Vegetation |
|---|---|---|---|---|
| a | Region A | 1 | 0 | 1 |
| b | Region A | 0 | 1 | 1 |
| c | Region A | 1 | 1 | 0 |
| d | Region A | 1 | 0 | 1 |
| e | Region A | 1 | 0 | 1 |
|   | SUBTOTAL | 4 | 2 | 4 |
| f | Region B | 1 | 0 | 1 |
| g | Region B | 1 | 0 | 0 |
| h | Region B | 1 | 0 | 0 |
| i | Region B | 1 | 0 | 1 |
| j | Region B | 1 | 0 | 0 |
|   | SUBTOTAL | 5 | 0 | 2 |
| k | Region C | 0 | 1 | 0 |
| l | Region C | 0 | 1 | 0 |
| m | Region C | 1 | 1 | 0 |
| n | Region C | 1 | 1 | 0 |
| o | Region C | 1 | 1 | 0 |
|   | SUBTOTAL | 3 | 5 | 0 |
|   | Total | 12 | 7 | 6 |

The objective is to choose a subset of rows from each region such that the column totals are as closely matched to as possible a target number of patches, for example, as required by the output of the distribution processing. This may be achieved by dropping some rows, which equates to discarding those patches, and/or by using some rows multiple times, which equates to representing those patches multiple times in the output dataset. When this occurs, this is used to determine how many times that patch should be "augmented" in training. Further details of this augmentation will be described below.

The simulated annealing algorithm is applied to this matrix of statistics in order to find the optimal subset of patches. In the context of the present disclosure, the simulated annealing algorithm is run by scoring the possible solutions according to the absolute difference between an achieved class score and a target class score, weighted by class scarcity, as will now be described.

At step 6.6, the target class score is determined, which can be done in at least two different ways.

In a first implementation, the target class score is determined by the output of the distribution. For example, using the example of FIG. 3 again, the output from the distribution may require two patches of the road class 30, five patches of the building class 32, and three patches of the vegetation class 34 from region A. Other requirements may also be placed, for example, requiring that a predetermined percentage of all possible patches must be used, or that no patch can be used more than a predetermined number of times.

In a second implementation, the target class score is determined as the median pixel or patch count per class across the dataset (step 6.6), depending on whether your matrix is represented as total area per class or as a binary number per class. This can be either globally or set for specific classes individually. For example, the target class score is calculated by summing all of the pixel or patch count for each class, and then taking the median value. In the example provided in Table 10, the median value of the patch count across all three classes is 7 (i.e., the patch count for buildings), and so the target class score may be 7. That is to say, the target will be to select subset of patches so that each column (i.e., each class) totals as close to 7 as possible.

Alternatively, to set a target class score for each feature class, the target number of patches for each class may be determined (e.g. as calculated in the above distribution method) and the average number of pixels within that target number patches may be taken as the target class score for each class.

At step 6.8, the simulated annealing approach starts by selecting an initial random subset of the available patches/rows using the target class score.

For each selected subset of patches, an achieved class score is calculated. The achieved class score is calculated by first summing the pixel or patch count across all selected patches for each class to determine a set of class scores. Once this set of class scores have been determined, the differences between the target class score and the class scores are calculated. The achieved class score across the selected subset of patches is then determined by using a either a Mean absolute error (MAE) or a Root mean squared error (RMSE) calculation. For example, using MAE, the achieved class score may be determined using the following equation:

$$\sum_{i=1}^{n} \frac{|y_i - x_i|}{n} \quad [2]$$

Where y is the class score, x is the target class score, and n is the number of patches. In cases, where a target class score is calculated for each class, an achieved class score may be determined for each individual class.

Once the initial subset of patches has been selected and scored, a new candidate solution is requested at step 6.10 and the achieved class score is calculated for the candidate subset of patches. The candidate subset of patches is selected by making a small permutation to the previous solution (i.e., the subset selected prior to the candidate subset), for example, by removing 10% of the patches of the previous subset and adding back in the same number of patches from those that were unused in the previous solution. Once that new candidate solution has been scored, it is compared to the previous solution to determine whether an improved solution has been identified, at step 6.12. If the new candidate solution is an improved solution, it is automatically accepted, and becomes the solution to which the next candidate solution is compared, with the algorithm returning to step 6.10. Furthermore, if it is better than any other solution seen to date, it is stored as the "best solution". However, if the new candidate solution is not an improved solution, an "acceptance probability" is then calculated at step 6.14 to determine the probability that the solution can be accepted. The acceptance probability is calculated using the following equation, known as the 'Metropolis criterion':

$$prob = e^{-\left|\frac{score(candidate)-score(current)}{Current\ Temperature}\right|} \quad [3]$$

The current temperature is a virtual parameter that defines how far the algorithm has progressed towards the best solution. The algorithm starts with the temperature set to a high value, which is then decreased at each step according to a predefined schedule until the temperature is zero. The probability that the worse solution can be accepted will depend on the stage at which the algorithm is at, that is, how close the algorithm is to reaching "freezing" temperature. The closer to zero, the less likely the algorithm is to accept a worse solution.

At step 6.16, the calculated acceptance probability will determine whether the solution should be accepted as the "best" solution or not. If successful, the worse solution will be accepted and stored as the "best" solution to date (for example, in storage means 600), and if not, the algorithm will stick with the previous outcome. The algorithm will then move onto the next iteration by permuting the previous solution to generate a new candidate subset of patches for consideration.

Each time a new candidate subset of patches is required, the current subset of patches is randomly changed by either adding some extra patches from the full set, dropping some of the currently selected patches, or both. The acceptance probability is then calculated. If the new selection is "better" then it will be kept, and the recorded "best" solution will be replaced with the current solution; if it is worse, it may or may not be kept depending on the stage of the search (this helps to find a globally optimal solution rather than getting stuck on a local minimum). As the algorithm progresses, it becomes less and less likely that a worse solution will be accepted and it will eventually reach freezing temperature, at which point only "better" solutions will be accepted on subsequent iterations (a "greedy" search), thereby limiting the search space that can be explored in the remaining iterations.

After all iterations have been completed, the best recorded solution will be identified as the optimal solution, at step 6.18.

In the example provided in Table 10, where the target class score is set as the output of the distribution {2,5,3}, the best solution for Region A may be three copies of patch b and two copies of patch c. The number of "copies" determines the number of times this patch should appear in the training data, for example, by augmentation.

Once the best solution has been determined, the selected subset of patches can be output as training data and input to the machine learning system 600 for training.

As such, this simulated annealing technique is applied so as to identify the nearest optimal combination of patches that give the most diversity across all classes. When certain classes dominate, such as dirt and grass, and where patches also have rarer classes such as rail or road, it can often be difficult to determine which patches are more important than others for selection. This technique helps to solve that problem. In addition, by allowing the algorithm to select the same patch more than once, the output can determine not only where the data should be under-sampled (discarded) but also where it should be oversampled (used repeatedly). A request by the algorithm to oversample a patch is therefore considered to mean that augmentation processes should be used to include that patch in various modified forms in the final training dataset. In this respect, augmentation is a process in deep learning image processing, whereby a patch is used multiple times by modifying the patch in some way, for example, by taking a mirror image, changing the colour contrast, blurring the image, taking a sub-image or any other suitable modification. In doing so, patches that are particularly useful (e.g. they contain a lot of a rare class of feature) can be used multiple times in order to obtain a balanced dataset.

The advantage of the simulated annealing method over the approach described with reference to FIG. 5 is that it is able to account for the reality that each patch is likely to contain more than one class, rather than treating each patch as containing a single class, where the result is that common classes end up being (even more) over-represented in the output, for example, if grass (common) is frequently found alongside railways (rare).

Overview of Example System

Figure 7:
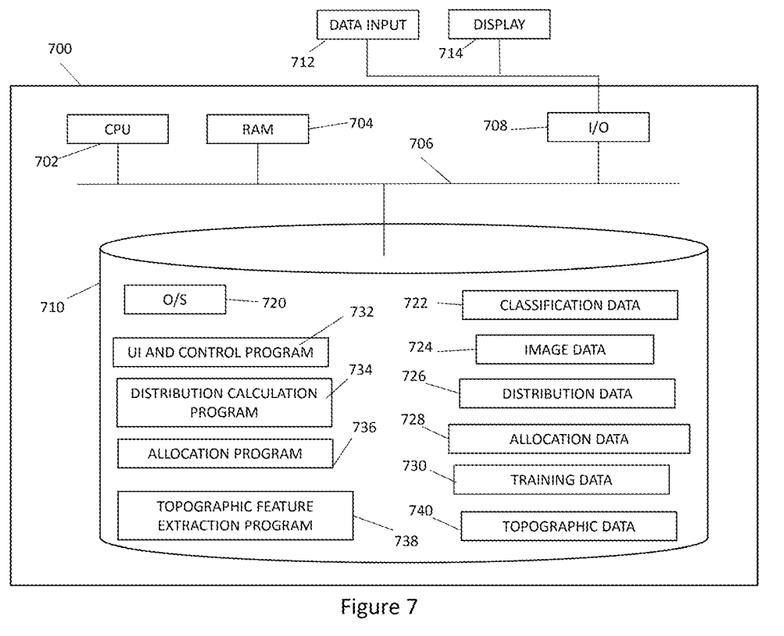
FIG. 7 is a block diagram illustrating a computer system on which aspects described herein may be implemented.

FIG. 7 illustrates an example of a general computing device 700 that may form the platform for aspects described herein. For example, the computing device 700 may be a computer, laptop, mobile phone, a tablet, a wearable computing device, or the like. The computing device 700 comprises a central processing unit (CPU) 702 and a working memory 704, connected by a common bus 706, and having an input-output (I/O) interface 708 arranged to receive control inputs from a user via a device connected to a data input port 712 such as a keyboard, mouse, touchscreen, push button, or other controller, and provide output information via a user interface which is displayed on a visual display device 714.

The computing device 700 is also provided with a computer readable storage medium 710 such as a hard disk drive (HDD), flash drive, solid state drive, or any other form of general-purpose data storage, upon which stored classification data 722, image data 724, distribution data 726, allocation data 728, training data, 730, topographic data 740, and various programs are arranged to control the computing device 700 to operate in accordance with embodiments and aspects as described herein. For example, stored on the computer readable storage medium 710 is an operating system program 720 that when run by the CPU 702 allows the system to operate. Also provided is a distribution calculation program 734, an allocation program 736, and a topographic extraction program 738, which implement different aspects described herein when run by the CPU 702. Specifically, the distribution calculation program 734 is configured to receive the classification data 722 and image data 724 to perform the method of optimizing the distribution of sample areas as described with reference to FIG. 3, from which the distribution data 726 is generated and stored. The allocation program 736 is configured to receive the image data 724, classification data 722, and optionally the distribution data 726, to perform the method of selecting a training dataset from the patches available to meet a target allocation described with reference to FIG. 5, from which allocation data 728 and thus training data 730 is generated and stored. Similarly, the topographic feature extraction program 738 is configured to receive the training data 730, from which it is trained to classify images.

In order to interface with and control the distribution calculation program 734, the allocation program 736, and the topographic extraction program 738, a user interface and control program 732 is also provided, that controls the computing device 700 to provide a visual output to the display 714, and to receive user inputs via any input means connected to the data input port 712, or any other device that may be connected to the I/O interface 708 in order to control the distribution calculation program 734, the allocation program 736, and the topographic extraction program 738.

Whilst the programs and data shown in FIG. 7 are described as being stored and implemented by a single computing system, it will of course be appreciated that multiple computing devices may be used to implement aspects and embodiments described herein. For example, the various data may be stored on one computing system in communication with a second computing system on which the distribution calculation program 834, allocation program 836, and topographic feature extraction program 838 are implemented. Likewise, the distribution calculation program 834, allocation program 836, and topographic feature extraction program 838 may all be implemented on separate computing devices.

Various modifications, whether by way of addition, deletion and/or substitution, may be made to all of the above described aspects and embodiments to provide further embodiments, any and/or all of which are intended to be encompassed by the appended claims.

The invention claimed is:

1. A computer-implemented method of processing image data for use in training a machine learning system for classifying image data, the method comprising: obtaining image data comprising a plurality of images, each image corresponding to a respective geographic area; processing the image data to identify one or more classes of topographic feature contained within each image, wherein processing the image data comprises determining a quantity of each respective topographic feature class contained within each image; generating a first dataset comprising a set of values for each image, wherein each value is representative of the quantity of one of the plurality of topographic feature classes contained within the respective image; and processing the first dataset to determine a number of samples required from each image for each topographic feature class, wherein the processing the first dataset comprises: (i) generating a normalised dataset, wherein the values of the first dataset are normalised across each image and each topographic feature class; and (ii) for each topographic feature class, calculating the number of samples required from each image based on the normalised dataset and a target number of samples for the respective topographic feature class, wherein the number of samples are used to train the machine learning system.

2. The method according to claim 1, wherein each value is indicative of a number of pixels within an image comprising one of the plurality of topographic feature classes.

3. The method according to claim 1, wherein generating the first dataset comprises populating a table comprising rows and columns with the set of values for each image, wherein each column corresponds to a respective image and each row corresponds to a respective topographic feature class.

4. The method according to claim 3, wherein generating the normalised dataset further comprises:
generating a first normalised dataset, wherein the values of the table are normalised across each column; and
generating a second normalised dataset, wherein the values of the first normalised data set are further normalised across each row.

5. The method according to claim 4, wherein each row of the second normalised dataset is multiplied by a target number of samples for the respective topographic feature class to thereby determine the number of samples required from each image.

6. The method according to claim 4, wherein generating the first normalised dataset comprises normalising the values of the table such that all values within each respective image sum to approximately 1.

7. The method according to claim 4, wherein generating the second normalised dataset comprises further normalising the values of the first normalised dataset such that all values corresponding to each respective topographic feature class sum to approximately 1.

8. The method according to claim 4, wherein generating the normalised dataset further comprises:

summing the values of the table across each topographic feature class to determine a total quantity of each topographic feature class within the first dataset;

determining a multiplier for each topographic feature class based on the total quantity of said topographic feature class relative to a topographic feature class having a highest total quantity; and multiplying the values of the table for each topographic feature class by its respective multiplier, wherein the multiplied values are used to generate the first normalised dataset.

9. The method according to claim 1, wherein a sample comprises a portion of an image.

10. The method according to claim 1, further comprising selecting one or more samples from each image based at least in part on the number of samples determined for each topographic feature class.

11. The method according to claim 10, further comprising training a machine learning system to classify images using the selected one or more samples.

12. The method according to claim 10, wherein selecting one or more samples from each image further comprises selecting samples from each image based on the number of samples determined for each topographic feature class and a total quantity of each topographic feature class contained within the first dataset, wherein samples containing the topographic feature class having the smallest total quantity are selected first.

13. The method according to claim 10, wherein selecting one or more samples from each image further comprises:
    identifying a plurality of samples for each image, wherein each sample comprises a portion of said image;
    identifying one or more classes of topographic feature contained within each sample, wherein the identifying comprises determining a quantity of each respective topographic feature class contained therein; and
    applying a simulated annealing algorithm to the plurality of samples, wherein the simulated annealing algorithm iteratively selects candidate subsets of samples from the plurality of samples for each image, and scores the candidate subsets of samples according to the quantities of the topographic feature classes contained therein, to thereby identify an optimal subset of samples from each image such that a balanced distribution of the topographic feature classes is obtained.

14. The method according to claim 13, wherein applying the simulated annealing algorithm comprises:
    selecting, for each image, an initial subset of samples from the plurality of samples, wherein each initial subset of samples is scored according to the quantities of the topographic feature classes contained therein;
    selecting, for each image, a candidate subset of samples from the plurality of samples, the candidate subset of samples being at least partially different to the initial subset of samples, wherein each candidate subset of samples is scored according to the quantities of the topographic feature classes contained therein;
    comparing the score of the candidate subset of samples to the score of the initial subset of samples to thereby determine whether the candidate subset of samples is an improved solution.

15. A system comprising: one or more processors; and at least one computer-readable storage medium storing one or more instruction(s) arranged such that when executed by the one or more processors, the system is configured to process image data for use in training a machine learning system for classifying image data by: obtaining image data comprising a plurality of images, each image corresponding to a respective geographic area; processing the image data to identify one or more classes of topographic feature contained within each image, wherein processing the image data comprises determining a quantity of each respective topographic feature class contained within each image; generating a first dataset comprising a set of values for each image, wherein each value is representative of the quantity of one of the plurality of topographic feature classes contained within the respective image; and processing the first dataset to determine a number of samples required from each image for each topographic feature class, wherein processing the first dataset comprises: (i) generating a normalised dataset, wherein the values of the first dataset are normalised across each image and each topographic feature class; and (ii) for each topographic feature class, calculating the number of samples required from each image based on the normalised dataset and a target number of samples for the respective topographic feature class, wherein the number of samples are used to train the machine learning system.

16. The system according to claim 15, wherein each value is indicative of a number of pixels within an image comprising one of the plurality of topographic feature classes.

17. The system according to claim 15, wherein the system is further configured to generate the first dataset by populating a table comprising rows and columns with the set of values for each image, wherein each column corresponds to a respective image and each row corresponds to a respective topographic feature class.

18. The system according to claim 17, wherein the system is further configured to generate the normalised dataset by:
    generating a first normalised dataset, wherein the values of the table are normalised across each column; and
    generating a second normalised dataset, wherein the values of the first normalised data set are further normalised across each row.

19. The system according to claim 18, wherein each row of the second normalised dataset is multiplied by a target number of samples for the respective topographic feature class to thereby determine the number of samples required from each image.

20. The system according to claim 18, wherein the system is further configured to:
    generate the first normalised dataset by normalising the values of the table such that all values within each respective image sum to approximately 1; and
    generate the second normalised dataset by normalising the values of the first normalised dataset such that all values corresponding to each respective topographic feature class sum to approximately 1.

* * * * *